INVENTOR.
JOHN R. COX
BY Milburn & Milburn
ATTORNEYS.

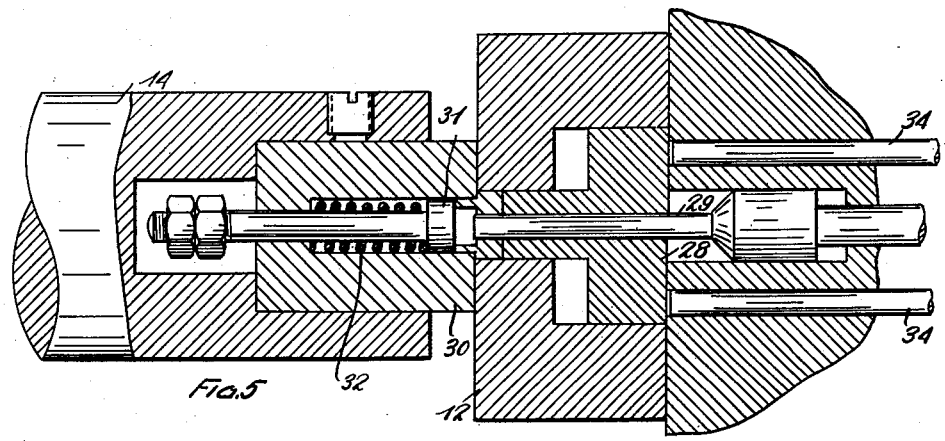
Fig.5
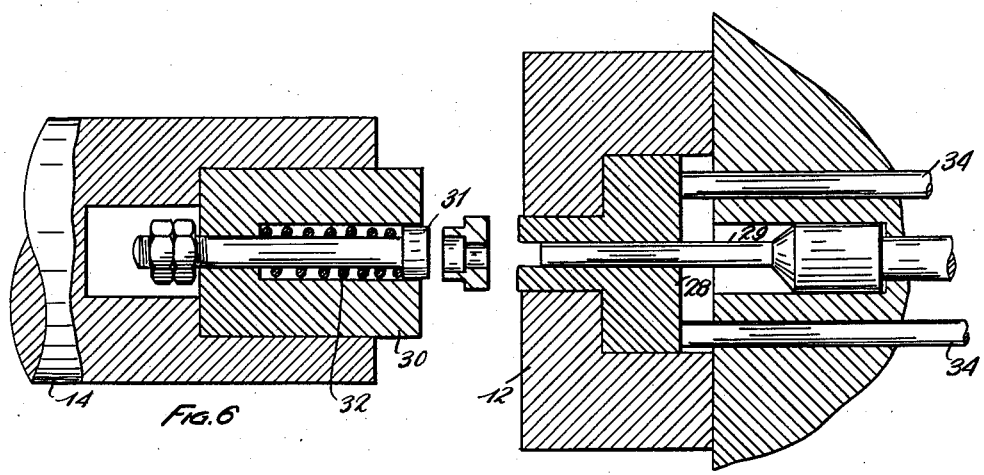
Fig.6
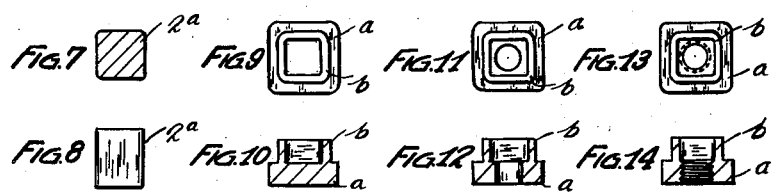
Fig.7 Fig.9 Fig.11 Fig.13
Fig.8 Fig.10 Fig.12 Fig.14
Fig.15

Aug. 26, 1941.   J. R. COX   2,253,765
MACHINE FOR MAKING CLINCH NUTS
Filed Aug. 3, 1938   5 Sheets-Sheet 5
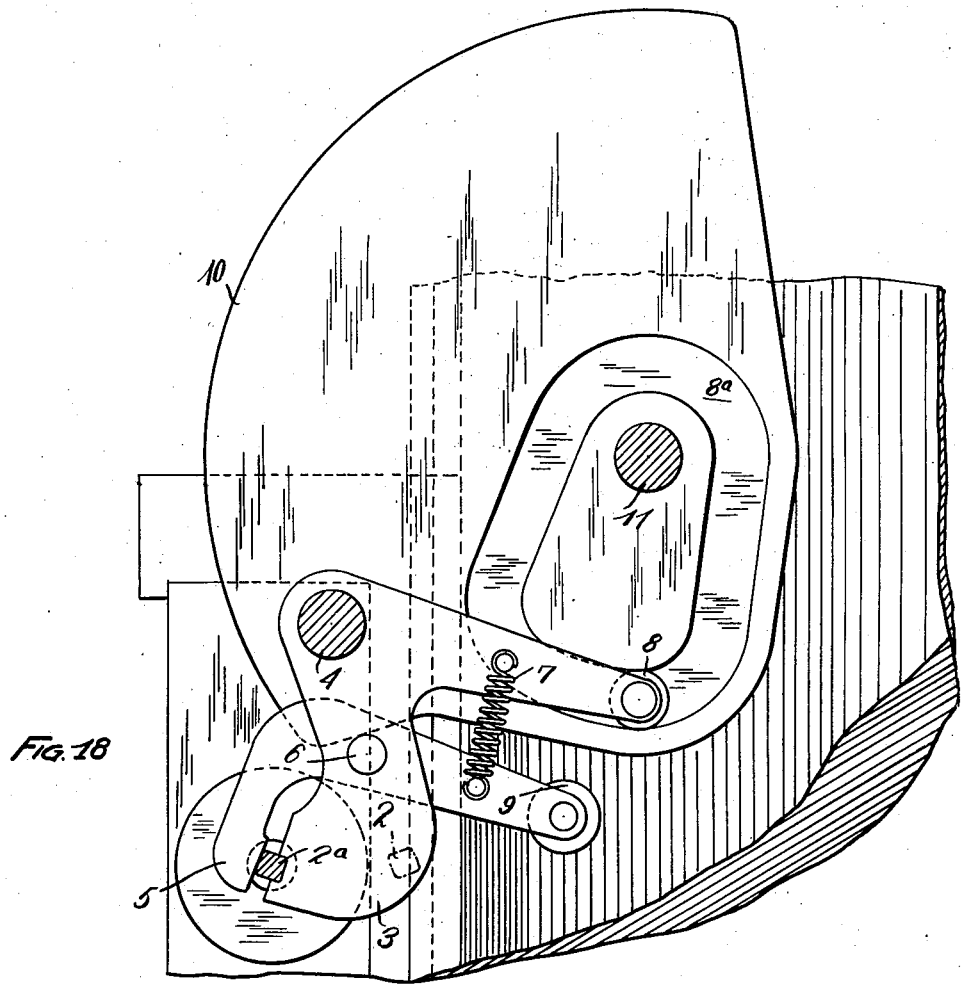
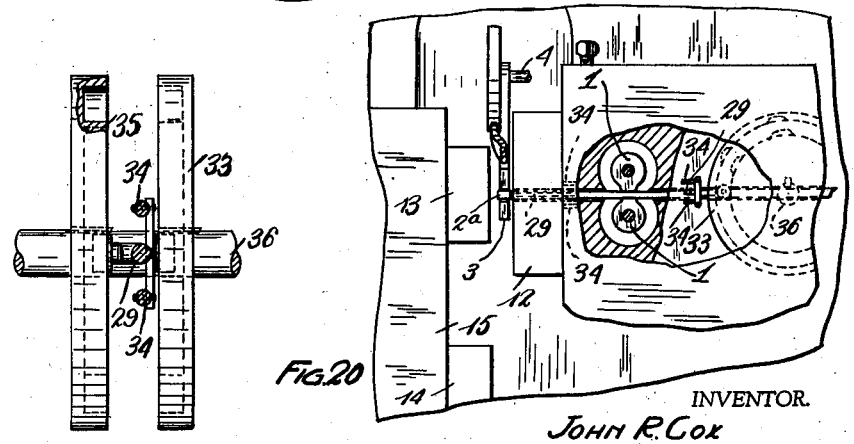
INVENTOR.
JOHN R. COX
BY *Milburn & Milburn*
ATTORNEYS.

Patented Aug. 26, 1941

2,253,765

UNITED STATES PATENT OFFICE 2,253,765

MACHINE FOR MAKING CLINCH NUTS

John R. Cox, Cleveland, Ohio, assignor to Thompson Products, Inc., Cleveland, Ohio Application August 3, 1938, Serial No. 222,754

6 Claims. (Cl. 10—78)

This invention relates to improvements in a machine for making clinch nuts.

My present invention contemplates not only the forming of a slug of metal into a nut body by means of dies but also the punching of a hole therethrough, preparatory to the threading operation, and this constitutes the object of my invention.

A further object consists in devising such a machine with means for automatically positioning die members successively for the operations of forming a metal slug into a nut body with a clinching flange and punching a hole through the nut body.

More specifically, my invention contemplates the supplying of slugs of metal to a stationary die with which other die members are adapted to co-operate in the formation of the nut body with a clinching flange, the punching of a hole through the nut body, and in the discharge of the nut body, all of these several operations being performed automatically in properly timed sequence in the same machine.

Other objects will appear from the following description and claims when considered together with the accompanying drawings.

Fig. 5 illustrates the same parts during the hole-punching operation;

Fig. 6 illustrates the same parts as the nut blank is being ejected after the punching of the hole;

Figs. 7 and 8 are views of the original slug shown in section and elevation, respectively;

Figs. 9 and 10 are views of the nut blank before punching the hole, this blank being shown in end elevation and vertical section, respectively;

Figs. 11 and 12 are an end elevation and vertical section, respectively, of the nut blank after the punching of the hole;

Figs. 13 and 14 are an end elevation and a vertical section, respectively, of the nut blank after the screw threads have been supplied;

Fig. 15 illustrates how this finished nut is clinched to sheet metal;

Fig. 18 is a view taken on line 18—18 of Fig. 1 and illustrates in detail the cam mechanism for controlling the movements of the shearing and transferring means;

Fig. 19 is a view taken on line 19—19 of Fig. 1 and indicates the cam means for operating the punch and ejector; and Fig. 20 is an enlarged view of part of Fig. 1 with part broken away to indicate the relative location of the means for intermittently feeding the bar to the shearing means.

Figure 1:
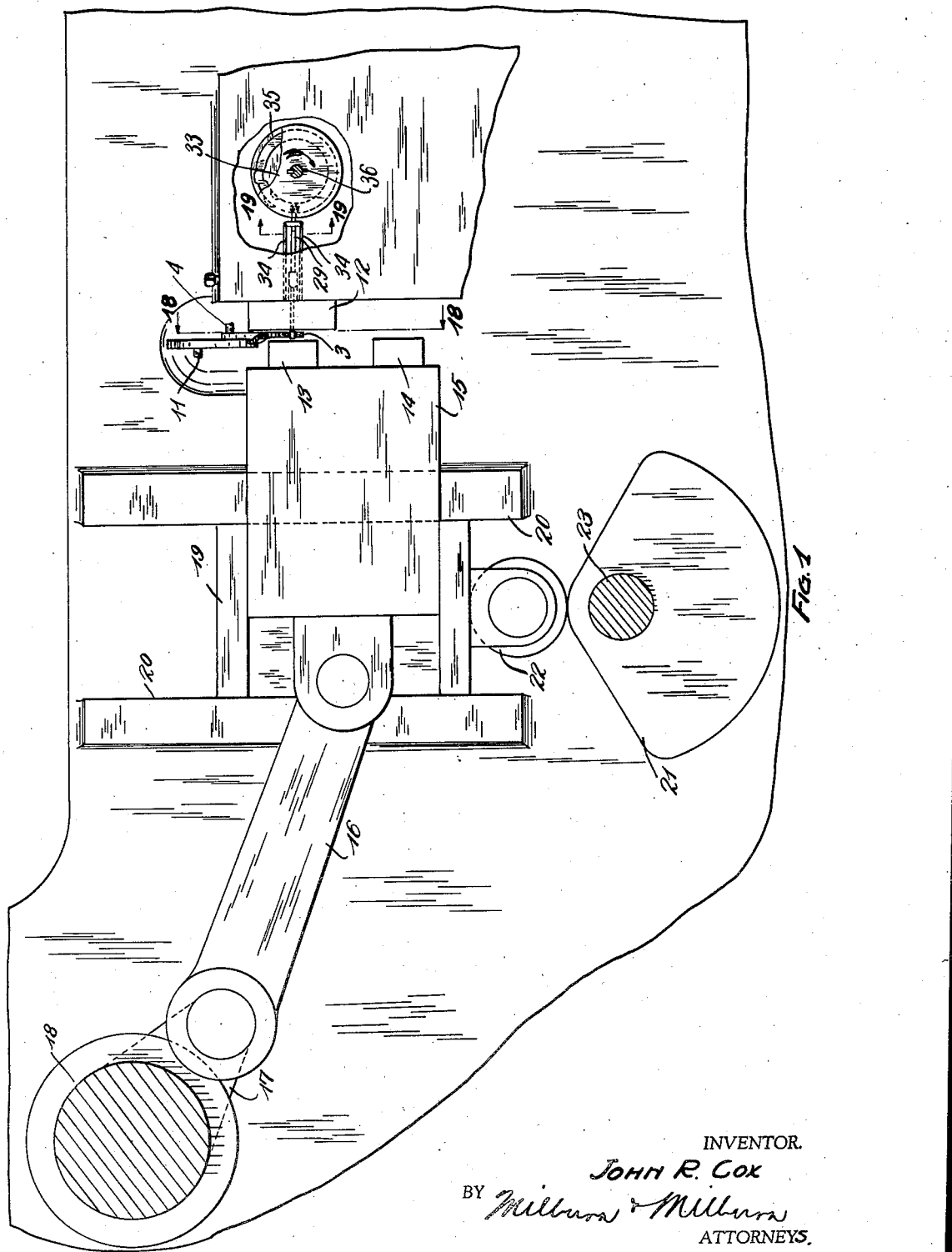
Fig. 1 is a general view of my improved mechanism.

It is to be understood that the present form of disclosure is merely for the purpose of illustration and that there may be devised various modifications thereof without departing from the spirit of the invention as herein set forth and claimed and that all such variations are intended to be comprehended hereby.

Only the novel features of my machine structure are emphasized in the accompanying drawings, it being understood that all of the several mechanisms herein pointed out are operatively connected so as to be driven in properly timed sequence from a common source of power for performance of the several functions herein ascribed thereto.

Any conventional means, such as the rotating gripping rollers indicated in a general way by reference numeral 1, may be employed for intermittently feeding rectangular steel stock bar 2 into the machine so that slugs of the required length may be sheared therefrom, the shearing mechanism being indicated on an enlarged scale in Fig. 18. As each slug is cut, it is carried to the position indicated by reference numeral 2a, where it is released by the shearing and transferring mechanism but only after the slug has been effectively engaged by the die mechanism, as indicated in a general way in Fig. 1. The operation of the die mechanism, in my first form of device, is performed in two successive steps, the one to give the slug the shape of a clinch nut and the other to punch a hole therethrough for later application of the screw threads.

The hole-punching means is operated by a cam mechanism which is indicated as part of the combination shown in Fig. 1 and is shown in larger detail in Fig. 19. The means for automatically removing the completed nut blank from the machine is also operated by cam mechanism which is associated with the hole-punching cam means, as indicated also in Figs. 1 and 19.

Thus far I have described briefly the primary method of operation employed by me and I will now proceed with a more detailed description.

The rectangular stock 2 is fed into the machine so as to be received at a point in close proximity to the die mechanism, the relative proximity of these two positions being indicated in Fig. 18. The cutter 3, which is rockably mounted at 4 about a fixed axis, will engage the one side of the steel stock 2 while at the same time the gripper 5 will engage the opposite side thereof, the gripper 5 being rockably mounted at 6 upon the cutter arm 3 and being normally drawn towards closed position by the spring 7 which extends between the arms of the cutter and gripper. The arm of the cutter has a roller 8 engaging in the groove 8a of the cam body; and the gripper arm 5 has a roller 9 which is adapted for engagement by the cam 10 provided upon the same combined cam body. This cam body is mounted upon the rotary shaft 11 which is connected to the operating mechanism of the machine.

It will be observed that the cam slot 8a is so designed that the shearing action of the cutter will be gradual and that the slug will be held by the cutter and gripper in still position adjacent the dies long enough for the transfer of the slug thereto. During the cutting and transfer of the slug, the gripper 5 is held by its spring 7 in engagement with the steel stock. Then when the slug has been transferred to the dies, the abrupt form of cam 10 will cause quick release of the gripper 5 and withdrawal of the same from the path of the slug so as to clear the same during withdrawing movement with the cutter 3 to their initial position for repetition of the same operation. By the time the cutter 3 will have returned to its initial position, the bar of metal stock 2 will be advanced and the gripper also will come into engagement therewith preparatory to the shearing off of the next slug in the manner above described.

The die mechanism consists of a stationary die 12 and two movable die members 13 and 14 which are successively brought into operation with the stationary die 12. By means of the mechanism above described, the slug is placed in front of the stationary die 12, at which time the first of the two movable or companion dies, that indicated at 13, is in alignment with the stationary die 12 and it is brought into engagement with the slug 2a which is then held between these two die members for the first operation, to be hereinafter described.

The two movable die members 13 and 14 are carried by the transversely slidable holder 15 which is operatively connected to the one end of the connecting rod 16, the other end of which is pivotally connected to the crank 17 operated by the rotatable shaft 18. The die holder 15 is slidably mounted in the slide 19 for slidable movement vertically in the slide-way 20, this movement being effected by means of a cam 21 which engages a cam roller 22 on the slide 19. The cam 21 is mounted on rotatable shaft 23 which is operated at proper rate of speed with respect to that of shaft 18. These parts are operated in such manner and at such relative rates of speed that the first die member 13 is brought into engagement with the slug 2a, as above explained; and then after the first die operation, the second die member 14 takes the place of the first die member 13 so as to perform the second operation. It should be recalled that the first die operation consists in forming the slug into a nut body and the second die operation consists in punching a hole through the nut body.

Figure 2:
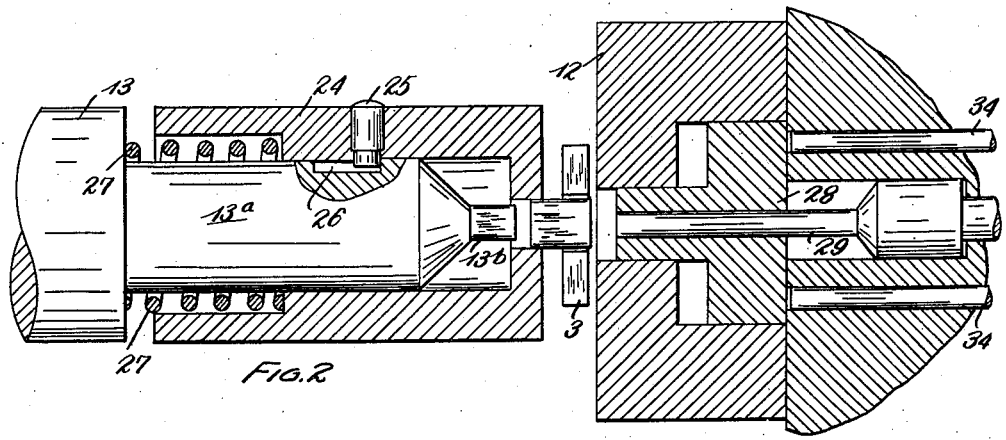
Fig. 2 illustrates the initial position of the first movable die member with respect to the stationary die.

In Fig. 2 we see the slug being transferred from the cutter 3 and gripper 5 to the die members, the first movable die member 13 having been moved laterally into engagement with the slug 2a so as to hold the same and thus permit the retreat of the cutter and gripper.

Figure 3:
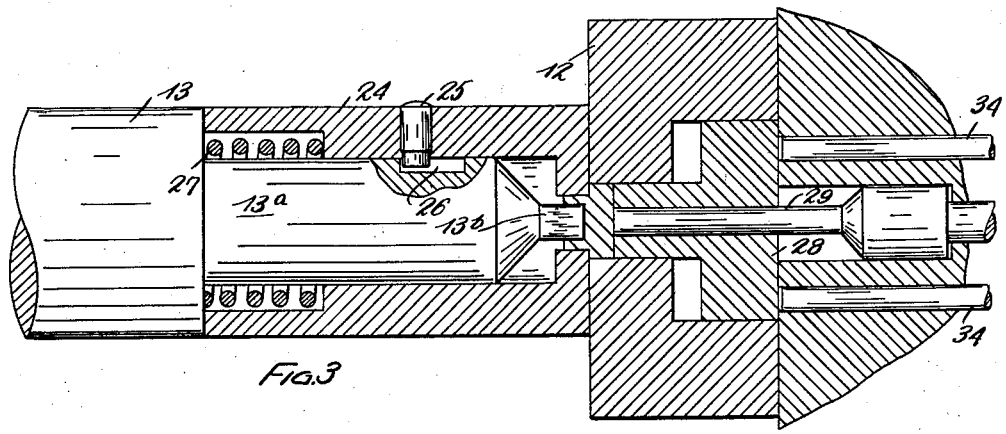
Fig. 3 illustrates the advanced position of the same.

The first movable die member 13 has a reduced forward portion 13a which is surrounded by the longitudinally slidable member 24 provided with an end aperture which is adapted to engage over the end of the slug and through which the still further reduced end portion 13b of the die member 13 is adapted to be projected so as to effectively engage the slug, as seen in Fig. 3. The longitudinal movement of the hollow member 24 is limited by the interengagement of pin 25 and slot 26 and it is normally forced outwardly by the coil spring 27 which is compressed when the die member 13 is forced into engagement with the slug.

During the operation of the first die member 13 (Figs. 2 and 3), there is a space in the stationary die 12 within which the slug is received and formed into the nut body by action of die member 13. As will be observed, the extent of this space is greater than the width of the end aperture in the hollow member 24, and the reduced end 13b of the die member is of less diameter than the width of this aperture. Consequently, the effect of the first die operation is to form the slug into a comparatively wide body portion a and a comparatively reduced flange portion b, this flange portion b being formed in the space between the end 13b of the die and the surrounding portion of the apertured body 24, as clearly indicated in Fig. 3.

During this operation, the ejector 28 of the stationary die occupies withdrawn position therewithin, as does also the punch 29, the end of the punch 29 being flush with the ejector 28 so as to provide the space for the shaping of the main body part of the nut blank, as above explained.

When the slug has been thus partially formed (Figs. 9 and 10), the first die member 13 is laterally withdrawn from engagement with the blank which remains in the stationary die 12 awaiting the second operation. Then when the first die member 13 has been thus withdrawn, the die holder 15 is moved vertically so as to raise the second die member 14 into proper elevation, whereupon the die holder 15 is moved laterally so as to bring the second die member 14 into engagement with the partially formed slug, as indicated in Fig. 4.

Figure 4:
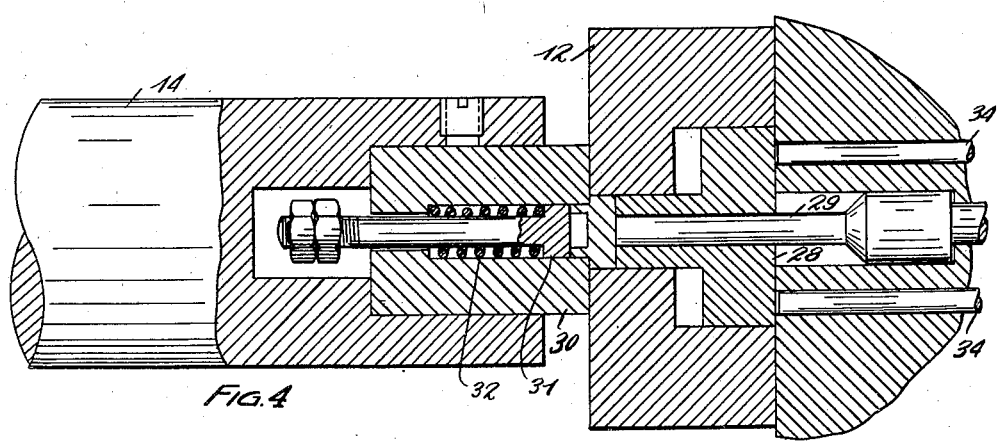
Fig. 4 illustrates the position of the second movable die member with respect to the stationary die, preparatory to punching a hole through the nut blank.

Within the end of the second die member 14 there is fixedly inserted the plug 30 which has an opening to fit over the flange b of the partially formed nut blank, as indicated in Fig. 4. Within this opening there is a resiliently yieldable plunger 31 with the enlarged head and the coil spring 32 affording resilient backing therefor. The head of this plunger fits within the opening and is adapted to engage the flange b of the partially formed nut blank while the end of the plug 30 engages the slug in the same manner as the slidable member 24 of the first die member 13. In this way, the partially formed nut blank is afforded an effective backing for the hole-punching operation.

With the partially formed nut in this position, the punch 29 is then operated so as to punch a hole centrally through the body of the nut blank, as indicated in Fig. 5. The punch 29 is operated by means of the cam mechanism 33, as indicated in Fig. 1 and as more fully illustrated in Fig. 19. It will be observed that the manner of engagement of the plunger 31 with the flange *b* of the partially formed nut affords a space into which the end of the punch 29 may project without any hindrance.

Then when the operation illustrated in Fig. 5 has been performed, the nut body is ready to be ejected from the die members in the manner indicated in Fig. 6. This is accomplished by means of the ejector pins 34 and the spring action of the plunger 31 upon withdrawal of the die member 14. The ejector pins 34 are operated by means of the cam 35 which is mounted upon the same shaft 36 with the cam 33. As will be seen, the cam 33 causes the punch 29 to be withdrawn as the nut blank is ejected, the cams 33 and 35 being so designed that the timing of the operations of the punch 29 and the ejector pins 34 will be in the sequence described, the punching operation being completed before the ejector pins are actuated. The nut body, as illustrated in Figs. 11 and 12, is then ready for the screw-threading operation so as to result in the finished product illustrated in Figs. 13 and 14.

As will be seen from an examination of the mechanism illustrated in Fig. 1, the cam shaft 23 will be operated at one-half the rate of speed of the crank shaft 18. That is, the cam 21 is effective in moving the die member 14 upwardly into operative position and in permitting the die member 13 to lower into operative position, this double operation being effected for each revolution of the cam shaft 23; while a complete revolution of the crank 17 is required for effecting actuation of each die member after it has been moved to operative position by the cam mechanism. Thus the crank shaft must rotate at twice the rate of speed of the cam shaft, as will be understood.

In the above-described operation, a hole is punched in the nut blank for application of the screw thread. But in Figs. 16 and 17 I have illustrated other forms of mechanism for forming the same kind of slugs into nut blanks in the same general manner except that a hole is not punched in the blank.

Figure 16:
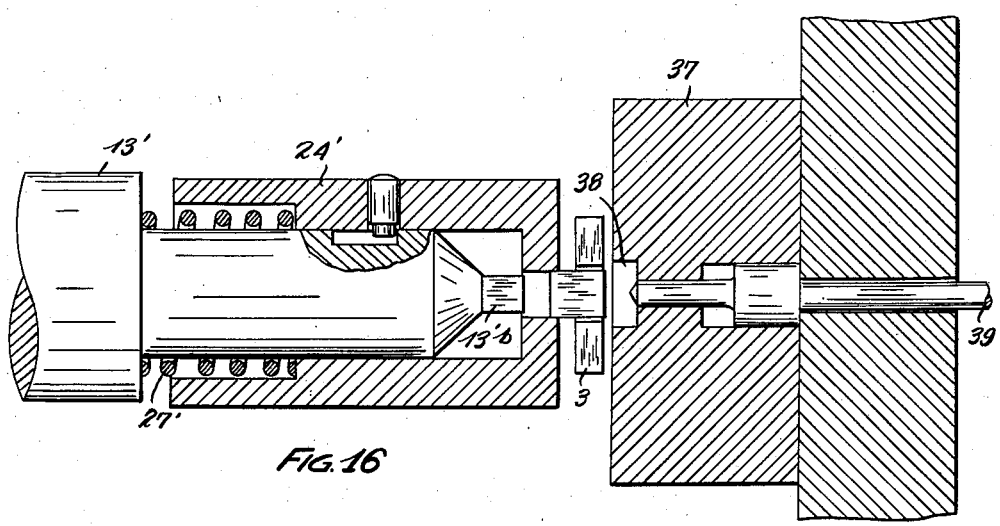
Fig. 16 is a view which corresponds with Fig. 2 but which illustrates a modification in which there is no provision for punching a hole in the nut blank.

In Fig. 16, the slug is cut and conveyed, in the same manner as described above, to position between the stationary and movable die members. In this particular form of mechanism, the stationary die 37 has a recess 38 into which the slug is adapted to be partially forced by the movable die member 13' which is of the same construction as the die member 13 in the preceding mechanism. As will be seen, the slug is first engaged by the apertured end of the slidable member 24' which is held in forward position on the die member 13' by means of the spring 27'. Then upon further movement of the die 13', its reduced end portion 13'b is caused to engage the slug in the manner above described. As a result, the slug is formed into a body portion in the recess 38 and a flange portion is formed about the reduced end 13'b of the movable die member. This operation is practically the same as described in connection with Figs. 2 and 3 except that in this modification the punch member is omitted and there is a single ejector 39 centrally disposed with respect to the recess 38.

The ejector 39 has a pointed end which projects into the recess 38 when the ejector occupies withdrawn position, as indicated in Fig. 16, its purpose being to provide a corresponding recess in the nut blank as a means of later facilitating the centering of the same for the tapping operation. When the nut blank has been thus formed, the movable die member is withdrawn, as in the above-described mechanism, and the ejector 39 is then operated to throw out the nut blank in co-ordination with the action of spring 27' in releasing the nut blank.

The ejector pin 39 is operated by a cam mechanism like that illustrated for the same purpose in the first form of mechanism above described, the operation of this cam being properly timed with respect to the other operations, the die member 13' being completely withdrawn prior to operation of the ejector pin 39. According to this modified form of device, there is but one movable die member, the second die member being omitted; and this means that the operating mechanism will be modified accordingly, as will be understood, the cam 21 and the slide 19 being omitted.

Figure 17:
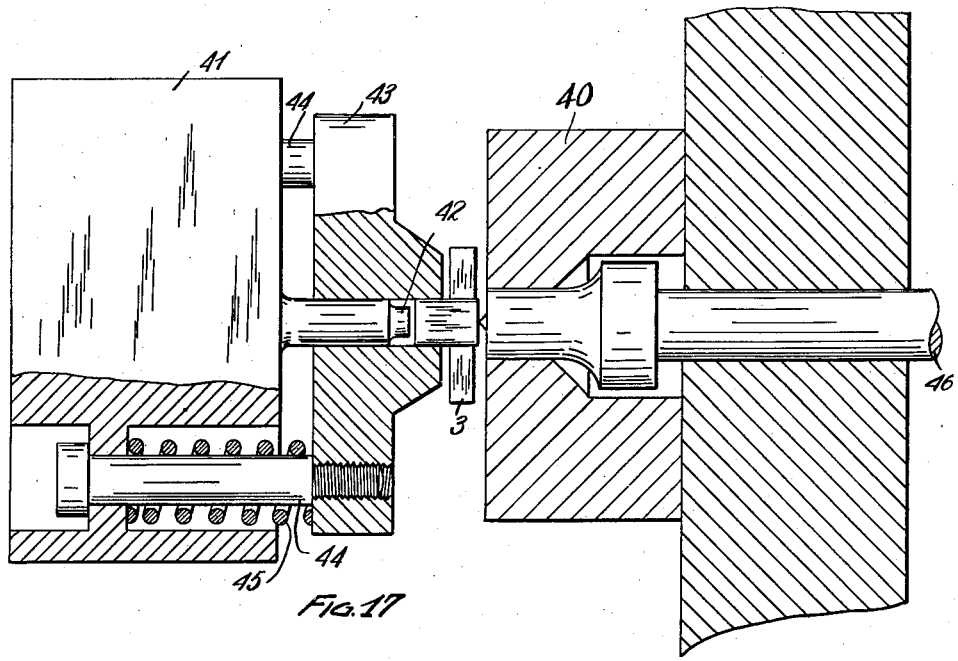
Fig. 17 illustrates a further modification along the lines of that shown in Fig. 16.

Referring now to Fig. 17, the slug is delivered by the cutter and gripper to position between the stationary die 40 and the movable die member 41 which has the reduced end portion 42 of less diameter than the opening in the slidable member 43. At diametrically opposite points, the slidable member 43 has screw-threaded thereinto the pins 44 which are slidably mounted in the die member 41. The springs 45 normally force the member 43 outwardly and such movement is limited by the engagement of the heads of the pins 44 with the web portions of the member 43 through which the pins extend.

The action of the single movable or companion die member in Fig. 17 is substantially the same as in Fig. 16. The slug is first engaged by the apertured end of the slidable member 43 which yields as the die 41 is moved towards engagement with the stationary die. The action of the dies is to form the body and flange of the nut blank, the flange being formed between the reduced end 42 of the movable die member and the surrounding wall of the slidable member 43.

In Fig. 17 the single ejector 46, when in withdrawn position, affords a recess in the fixed die of proper size for formation of the body part of the nut blank. The ejector pin 46 has a pointed portion in the center thereof to provide a central depression in the body of the nut blank for the same purpose as in Fig. 16. The ejector pin 46 is operated in the same manner as the pin 39 and ejects the nut blank at the proper time, the die member 41 being completely withdrawn prior to operation of the ejector pin 46, thereby permitting action of the springs 45 in releasing the nut blank from the movable die member.

It will be observed that in Fig. 17 the end of the ejector pin 46 constitutes the entire bottom wall of the recess in which the body of the nut blank is formed.

From the above it will be seen that I have devised a mechanism that is comparatively simple in its construction and operation and yet extremely efficient and dependable. The operation is automatic and continuous, the bar stock being intermittently fed for shearing and conveying slugs therefrom in succession to the dies. Each slug is positioned in operative relation to the stationary die and the two companion movable die members are automatically moved into operative position with respect to the slug and the stationary die for first forming the nut blank and then punching a hole therethrough, according to the form shown in all of the figures of the drawings except Figs. 16 and 17, in which there is formed the nut blank without the hole, as above explained. In either case, the blanks are then ready or are then prepared for application of the screw threads so as to result in the finished clinch nut shown in Fig. 13 and Fig. 14. As will be understood, this finished nut is adapted to have its flange b clinched in an aperture in sheet metal as a means of attaching the nut thereto, as illustrated in Fig. 15.

What I claim is:

1. A unitary machine for making clinch nuts, comprising a stationary die, means for supplying slugs of metal thereto, a companion die member adapted for co-operation therewith in forming a slug into a nut body and simultaneously forming a clinching flange thereon, a second companion die member adapted to engage the clinching flange to permit punching of the nut body from the opposite side thereof and while held in said stationary die, means carried by said stationary die for performing the punching operation, means for successively positioning said companion die members with respect to said stationary die, and operating means therefor.

2. A unitary machine for making clinch nuts, comprising a stationary die, means for supplying slugs of metal thereto, a companion die member adapted for co-operation therewith in forming a slug into a nut body and simultaneously forming a clinching flange thereon, a second companion die member adapted to engage the clinching flange to permit punching of the nut body from the opposite side thereof and while held in said stationary die, means carried by said stationary die for performing the punching operation, means carried by said stationary die for removing the nut therefrom, means for successively positioning said companion die members with respect to said stationary die, and operating means therefor.

3. A unitary machine for making clinch nuts, comprising a stationary die, means for supplying slugs of metal thereto, a companion die member adapted for co-operation therewith in forming a slug into a nut body and simultaneously forming a clinching flange thereon, a second companion die member for co-operation with said stationary die and having a spring plunger for engaging the clinching flange during the hole-punching operation and for automatically releasing the nut body thereafter, means carried by said stationary die for performing the hole-punching operation, means for successively positioning said companion die members with respect to said stationary die, and operating means therefor.

4. A unitary machine for making clinch nuts, comprising a stationary die, means for supplying slugs of metal thereto, a companion die member adapted for co-operation with said stationary die in forming a slug into a nut body and simultaneously forming a clinching flange thereon, a second companion die member for co-operation with said stationary die member and having a spring plunger for engaging the clinching flange during the hole-punching operation and for automatically releasing the nut body thereafter, means carried by said stationary die for performing the hole-punching operation, means carried by said stationary die for removing the nut body therefrom, means for successively positioning said companion die members with respect to said stationary die, and operating means therefor.

5. In a machine for making clinch nuts, the combination of a stationary die member, a punch member co-operating with said die member in constituting a stationary die during the blank-forming operation, means for supplying slugs of metal to said die, means adapted to be positioned automatically for co-operation with said stationary die for forming a slug into a nut blank with reduced central thickness, means adapted to automatically replace said blank-forming means for backing up said blank in spaced relation to said central portion thereof during the hole-punching operation, and means for operating said punch so as to form a hole in said central portion of the blank.

6. In a machine for making clinch nuts, the combination of a stationary die member, a punch member and an ejector member co-operating with said die member in constituting a stationary die during the blank-forming operation, means for supplying slugs of metal to said die, means adapted to be positioned automatically for co-operation with said stationary die for forming a slug into a nut blank, with reduced central thickness, means adapted to automatically replace said blank-forming means for backing up said blank in spaced relation to said central portion during the hole-punching operation, and means for operating said punch member and said ejector member in sequence so as to form a hole in said central portion of the blank and eject the same from said die member.

JOHN R. COX.